(12) United States Patent
Shiue et al.

(10) Patent No.: US 11,977,498 B1
(45) Date of Patent: May 7, 2024

(54) DATA INPUT DEVICE AND PROCESSING METHOD FOR INPUT DATA

(71) Applicant: Inpsytech, Inc., Hsinchu County (TW)

(72) Inventors: Wei-Ren Shiue, Hsinchu County (TW); Jian-Ying Chen, Hsinchu County (TW)

(73) Assignee: INPSYTECH, INC., Hsinchu County (TW)

( * ) Notice: Subject to any disclaimer, the term of this patent is extended or adjusted under 35 U.S.C. 154(b) by 1 day.

(21) Appl. No.: 18/085,875

(22) Filed: Dec. 21, 2022

(30) Foreign Application Priority Data

Oct. 12, 2022 (TW) .................................. 111138700

(51) Int. Cl.
*G06F 13/10* (2006.01)
*G06F 1/12* (2006.01)

(52) U.S. Cl.
CPC .............. *G06F 13/102* (2013.01); *G06F 1/12* (2013.01)

(58) Field of Classification Search
None
See application file for complete search history.

(56) References Cited

U.S. PATENT DOCUMENTS

2022/0052698 A1* 2/2022 Chen ...................... G11C 7/222

* cited by examiner

*Primary Examiner* — Scott C Sun
(74) *Attorney, Agent, or Firm* — Birch, Stewart, Kolasch & Birch, LLP

(57) ABSTRACT

A data input device includes a first delay line, a second delay line, a detection circuit, and a processing circuit. The detection circuit is configured to detect whether a first output data output to a system circuit deviates from a first detection range and to generate a first deviation signal in response to that the detection circuit detects the first output data deviates from the first detection range. The processing circuit normally takes a first delayed data delayed by the first delay line as the first output data. In response to that the processing circuit receives that the first deviation signal representing the first delayed data deviates from the first detection range, the processing circuit takes a second delayed data delayed by the second delay line as the first output data after the second adjustable delay magnitude of the second delay line is adjusted.

10 Claims, 10 Drawing Sheets

DATA INPUT DEVICE AND PROCESSING METHOD FOR INPUT DATA

CROSS-REFERENCE TO RELATED APPLICATION

This non-provisional application claims priority under 35 U.S.C. § 119(a) to Patent Application No. 111138700 filed in Taiwan, R.O.C. on Oct. 12, 2022, the entire contents of which are hereby incorporated by reference.

BACKGROUND

Technical Field

The present disclosure relates to the technology of data transmission. In particular, the present disclosure relates to a data input device and a processing method for input data that can achieve high-speed transmission.

Related Art

In a circuit, for example, in a memory circuit, a clock signal is usually taken as a timing reference for its operation. However, due to the variations in temperature and voltage, etc., the phase of the clock signal will deviate, thereby increasing the error rate of the memory circuit when the memory circuit samples an input data.

SUMMARY

The present disclosure provides a data input device. In an embodiment, the data input device includes a first delay line, a second delay line, a detection circuit, and a processing circuit. The first delay line is configured to delay an input data to obtain a first delayed data according to a first adjustable delay magnitude. The second delay line is configured to delay the input data to obtain a second delayed data according to a second adjustable delay magnitude. The detection circuit is configured to detect whether a first output data output to a system circuit deviates from a first detection range and to generate a first deviation signal in response to that the detection circuit detects the first output data deviates from the first detection range. The processing circuit is configured to normally take the first delayed data as the first output data. Furthermore, in response to that the processing circuit receives the first deviation signal representing that the first delayed data deviates from the first detection range, the processing circuit takes the second delayed data as the first output data after the processing circuit adjusts the second adjustable delay magnitude.

In some embodiments, after the processing circuit takes the second delayed data as the first output data, the processing circuit further returns to take the first delayed data as the first output data after the processing circuit adjusts the first adjustable delay magnitude in response to that the processing circuit receives another first deviation signal representing that the second delayed data deviates from the first detection range.

In some embodiments, the detection circuit includes a first delay unit, a second delay unit, a first sampling unit, a second sampling unit, a third sampling unit, and a determination unit. The first delay unit is configured to delay the first output data to obtain a first to-be-detected data according to a first predetermined delay magnitude. The second delay unit is configured to delay a sampling clock to obtain a delayed clock according to a second predetermined delay magnitude. The first sampling unit is configured to sample the first to-be-detected data to obtain a first data according to the sampling clock. The second sampling unit is configured to sample the first output data to obtain a second data according to the sampling clock. The third sampling unit is configured to sample the first output data to obtain a third data according to the delayed clock. The determination unit is configured to determine whether the first data, the second data, and the third data are all the same. The determination unit generates the first deviation signal in response to that the determination unit determines that any of the first data, the second data, and the third data are different.

In some embodiments, the processing circuit includes a positive edge selection unit, a negative edge selection unit, a combining output unit, and a processing unit. The positive edge selection unit is configured to select the first delayed data or the second delayed data as the first output data. The negative edge selection unit is configured to select the first delayed data or the second delayed data as a second output data. The combining output unit is configured to combine the first output data and the second output data into a combined data and to output the combined data to the system circuit. The processing unit is configured to normally control the positive edge selection unit to take the first delayed data as the first output data and to normally control the negative edge selection unit to take the first delayed data as the second output data.

In some embodiments, the detection circuit includes a positive edge detection module and a negative edge detection module. The positive edge detection module is configured to detect whether the first output data deviates from the first detection range and to generate the first deviation signal in response to that the positive edge detection module detects the first output data deviates from the first detection range. The negative edge detection module is configured to detect whether the second output data deviates from a second detection range and to generate a second deviation signal in response to that the negative edge detection module detects the second output data deviates from the second detection range. In response to that the processing unit receives the first deviation signal representing that the first delayed data deviates from the first detection range or the second deviation signal representing that the first delayed data deviates from the second detection range, the processing unit controls the positive edge selection unit and the negative edge selection unit to respectively take the second delayed data as the first output data and the second output data after the processing unit adjusts the second adjustable delay magnitude. Furthermore, in response to that the processing unit receives the first deviation signal representing that the second delayed data deviates from the first detection range or the second deviation signal representing that the second delayed data deviates from the second detection range, the processing unit controls the positive edge selection unit and the negative edge selection unit to respectively take the first delayed data as the first output data and the second output data after the processing unit adjusts the first adjustable delay magnitude.

The present disclosure further provides a processing method for input data. In an embodiment, the processing method includes: delaying an input data to obtain a first delayed data according to a first adjustable delay magnitude; delaying the input data to obtain a second delayed data according to a second adjustable delay magnitude; normally taking the first delayed data as a first output data output to a system circuit; detecting whether the first output data deviates from a first detection range; and taking the second delayed data as the first output data after adjusting the second adjustable delay magnitude in response to detecting that the first delayed data as the first output data deviates from the first detection range.

In some embodiments, after the step of taking the second delayed data as the first output data further comprises: returning to the step of taking the first delayed data as the first output data output to the system circuit after adjusting the first adjustable delay magnitude in response to detecting that the second delayed data as the first output data deviates from the first detection range.

In some embodiments, the step of detecting whether the first output data deviates from the first detection range includes: delaying the first output data to obtain a first to-be-detected data according to a first predetermined delay magnitude; delaying a sampling clock to obtain a delayed clock according to a second predetermined delay magnitude; sampling the first to-be-detected data to obtain a first data according to the sampling clock; sampling the first output data to obtain a second data according to the sampling clock; sampling the first output data to obtain a third data according to the delayed clock; determining whether the first data, the second data, and the third data are all the same; and determining that the first output data is detected to deviate from the first detection range in response to determining that any of the first data, the second data, and the third data are different.

In some embodiments, the processing method for input data further includes: normally taking the first delayed data as a second output data output to the system circuit; detecting whether the second output data deviates from a second detection range, wherein the step of taking the second delayed data as the first output data after adjusting the second adjustable delay magnitude in response to detecting that the first delayed data as the first output data deviates from the first detection range is: taking the second delayed data as the first output data and the second output data after adjusting the second adjustable delay magnitude in response to detecting that the first delayed data as the first output data deviates from the first detection range or detecting that the first delayed data as the second output data deviates from the second detection range; and performing the step of taking the first delayed data as the first output data output to the system circuit and the step of taking the first delayed data as the second output data output to the system circuit after adjusting the first adjustable delay magnitude in response to detecting that the second delayed data as the first output data deviates from the first detection range or detecting that the second delayed data as the second output data deviates from the second detection range.

In some embodiments, the processing method for input data further includes: combining the first output data and the second output data into a combined data; and outputting the combined data to the system circuit.

To sum up, according to one or some embodiments of the present disclosure, the data input device and the processing method for input data use a first delay line and a second delay line to delay an input data to separately obtain a first delayed data and a second delayed data and normally take the first delayed data as a first output data and detect whether the first output data deviates from a first detection range. In response to detecting that the first output data deviates from the first detection range, the deviation can be corrected by adjusting another delay line, for example, a second adjustable delay magnitude of the second delay line, and the data input device and the processing method according to one or some embodiments of the present disclosure take the second delayed data delayed by the second delay line as the new first output data after the second adjustable delay amount is adjusted. In this way, it is not necessary to interrupt the data transmission during correction, thereby achieving the high-speed transmission of input data. Furthermore, compared with a circuit that performs correction by delaying a sampling clock, one or some embodiments of the present disclosure can ensure that the sampling clock can hit the center position in each piece of data of the input data.

Detailed features and advantages of the present disclosure are described in detail in the following implementations, and the content of the implementations is sufficient for a person skilled in the art to understand and implement the technical content of the present disclosure. A person skilled in the art can easily understand the objectives and advantages related to the present disclosure according to the contents disclosed in this specification, the claims, and the drawings.

DETAILED DESCRIPTION

To make the objectives, features, and advantages of the embodiments of the present disclosure more comprehensible, the following provides detailed descriptions with reference to the accompanying drawings.

Figure 1:
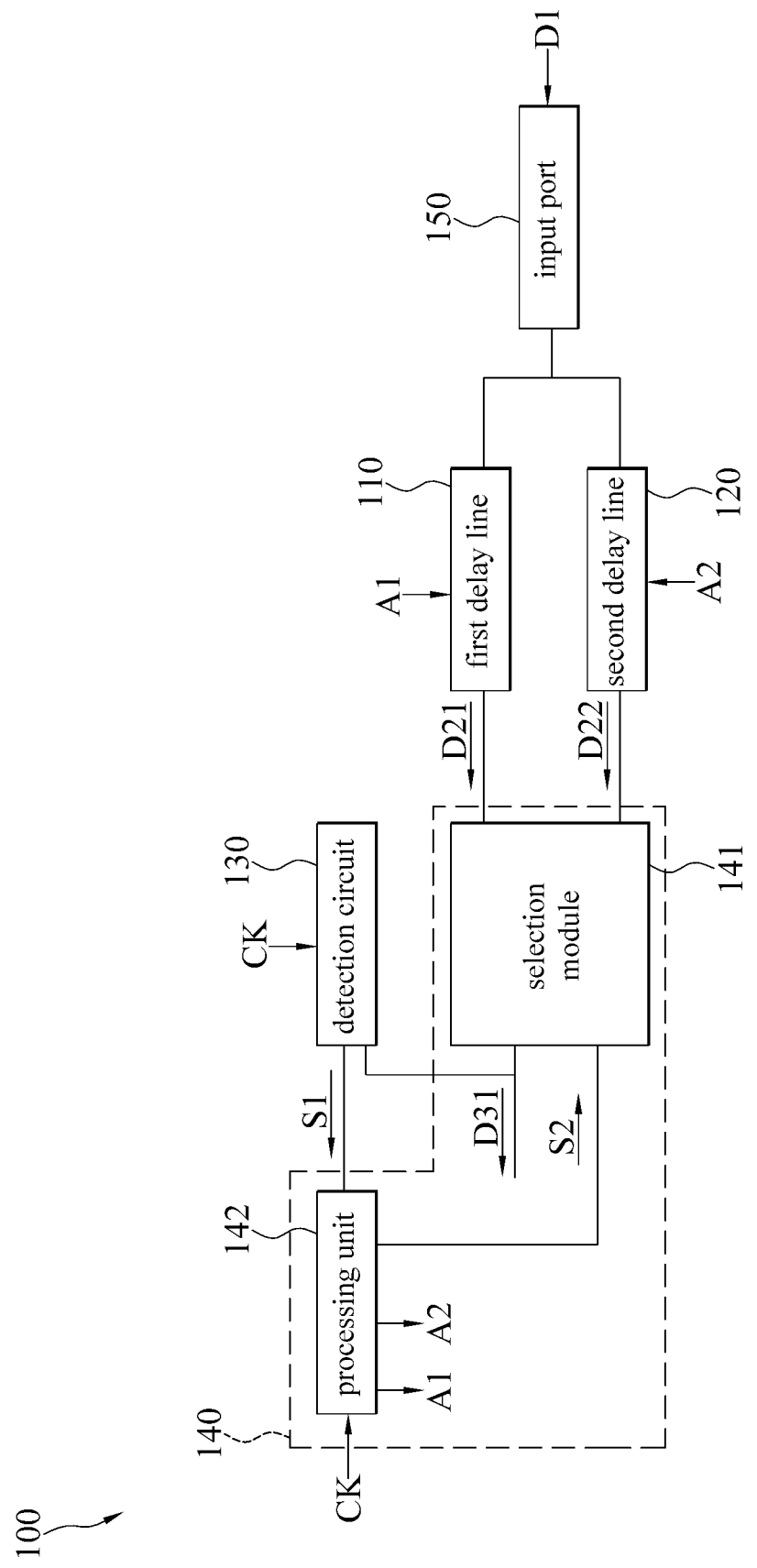
FIG. 1 illustrates a schematic block diagram of a data input device according to an embodiment of the present disclosure.

FIG. 1 illustrates a schematic block diagram of a data input device according to an embodiment of the present disclosure. Please refer to FIG. 1. A data input device 100 is configured to receive an input data D1. In some embodiments, the input data D1 includes multiple pieces of data. The data input device 100 can perform a processing method for the input data D1 according to any of the embodiments of the present disclosure on each piece of data of the input data D1, such that the positive edges and/or the negative edges of a sampling clock CK can hit (locate at) the central position in each piece of data. Furthermore, even if a deviation caused by the influence of variations in temperature, voltage, and so forth occurs, the data input device 100 performing the processing method according to any of the embodiments of the present disclosure can correct the deviation without interrupting the data transmission, thereby realizing the high-speed transmission (for example, but not limited to 16G bps) of the input data D1.

In some implementations, the data input device 100 may be applied to a transmission interface. For example, the transmission interface of a memory, such as a dynamic random access memory (DRAM), the transmission interface of a die-to-die, and the like, but the present disclosure is not limited thereto; the data input device 100 may be applied to any transmission interface. Furthermore, the data input device 100 may be implemented in a chip form through an integrated circuit process.

In an embodiment, the data input device 100 includes two delay lines (hereinafter, referred to as a first delay line 110 and a second delay line 120, respectively), a detection circuit 130, and a processing circuit 140. The processing circuit 140 is coupled to the first delay line 110, the second delay line 120, the detection circuit 130, and a system circuit (not shown). In some embodiments, the data input device 100 can further include an input port 150, and the input port 150 is coupled to the first delay line 110 and the second delay line 120.

The first delay line 110 is configured to delay the input data D1 input through the input port 150 to obtain a first delayed data D21 according to a first adjustable delay magnitude of a first setting signal A1. The second delay line 120 is configured to delay the input data D1 input through the input port 150 to obtain a second delayed data D22 according to a second adjustable delay magnitude of a second setting signal A2.

In some embodiments, the structure of the first delay line 110 may be substantially the same as the structure of the second delay line 120. In some implementations, the first delay line 110 and the second delay line 120 may be the delay line in any form, for example, a digitally controlled delay line, a voltage-controlled delay line, and the like. Since the detailed circuit structure and operation of the delay line are known by the person skilled in the art, thus, detailed descriptions thereof will be omitted. Furthermore, the input port 150 may be a parallel bus, but the present disclosure is not limited thereto.

The processing circuit 140 is configured to adjust the first adjustable delay magnitude of the first delay line 110 and the second adjustable delay magnitude of the second delay line 120, and the processing circuit 140 is configured to select the first delayed data D21 or the second delayed data D22 as a first output data D31 output to the system circuit.

The detection circuit 130 is configured to detect whether the first delayed data D21 or the second delayed data D22 which is currently served as the first output data D31 deviates from a first detection range. Furthermore, the detection circuit 130 is configured to generate a first deviation signal S1 to the processing circuit 140 in response to that the detection circuit 130 detects that the first output data D31 deviates from the first detection range, such that the processing circuit 140 can adjust, according to the first deviation signal S1, the adjustable delay magnitude of the delay line whose delayed data is not currently severed as the first output data D31, and the processing circuit 140 can take the delayed data output by the adjusted delay line as the first output data D31 after the adjustment is finished.

Figure 2:
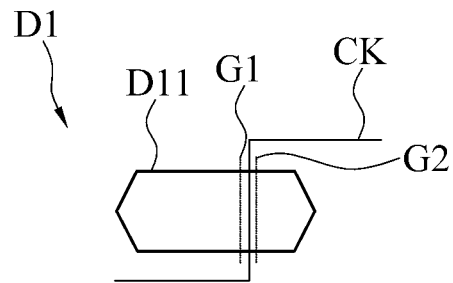
FIG. 2 illustrates a schematic view of a sampling clock and an input data according to an embodiment of the present disclosure.
Figure 3:
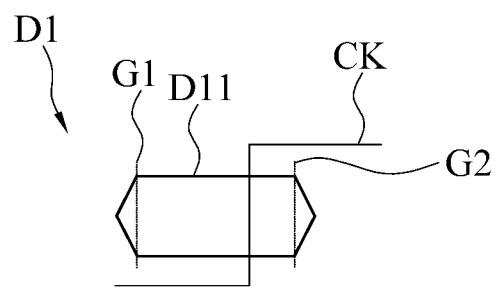
FIG. 3 illustrates a schematic view of after a left indicator and a right indicator in FIG. 2 is adjusted according to an embodiment of the present disclosure.
Figure 4:
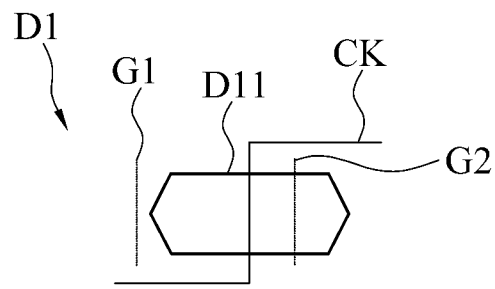
FIG. 4 illustrates a schematic diagram showing the input data in FIG. 3 is delayed according to an embodiment of the present disclosure.

In some embodiments, in a training (setting) stage of the data input device 100, in order to cause a positive edge or a negative edge of a sampling clock CK (take the positive edge of the sampling clock CK shown in FIG. 4 for example) to hit (or locate at) the central position of a piece of current data D11 of the input data D1, the data input device 100 can detect a relationship between the input data D1 and the sampling clock CK through the processing circuit 140 to correspondingly set the initial values of the first adjustable delay magnitude and the second adjustable delay magnitude. The data pattern of the input data D1 input in the training stage is already known by the processing circuit 140. For example, it is assumed that the data pattern of the input data D1 is "010" and the current data D11 is "1" are known, and it is assumed that the relationship between the input data D1 and the sampling clock CK is as shown in FIG. 2. Firstly, the processing circuit 140 may respectively adjust a left indicator G1 and a right indicator G2 until reaching the boundaries of the current data D11. The processing circuit 140 can determine whether the left indicator G1 has been adjusted to the left boundary of the current data D11 based on whether the data sampled at the left indicator G1 is "0", and the processing circuit 140 can also determine whether the right indicator G2 has been adjusted to the right boundary of the current data D11 based on whether the data sampled at the right indicator G2 is "0". After the left indicator G1 and the right indicator G2 are respectively adjusted to the boundaries of the current data D11, as shown in FIG. 3, the processing circuit 140 can obtain a data length according to the distance between the left indicator G1 and the right indicator G2 and find the central position of the current data D11 according to the data length. After that, the processing circuit 140 can generate a first setting signal A1 and a second setting signal A2 according to the central position to set the initial value of the first adjustable delay magnitude of the first delay line 110 and the initial value of the second adjustable delay magnitude of the second delay line 120, thereby the training of the data input device 100 can be completed. In this embodiment, the processing circuit 140 will increase the delay magnitude of the input data D1, as shown in FIG. 4.

In some implementations, the sampling clock CK may be a global clock generated by a clock source (for example but not limited to an oscillator). Furthermore, the sampling clock CK may be delayed by a clock tree, but the present disclosure is not limited thereto.

Figure 5:
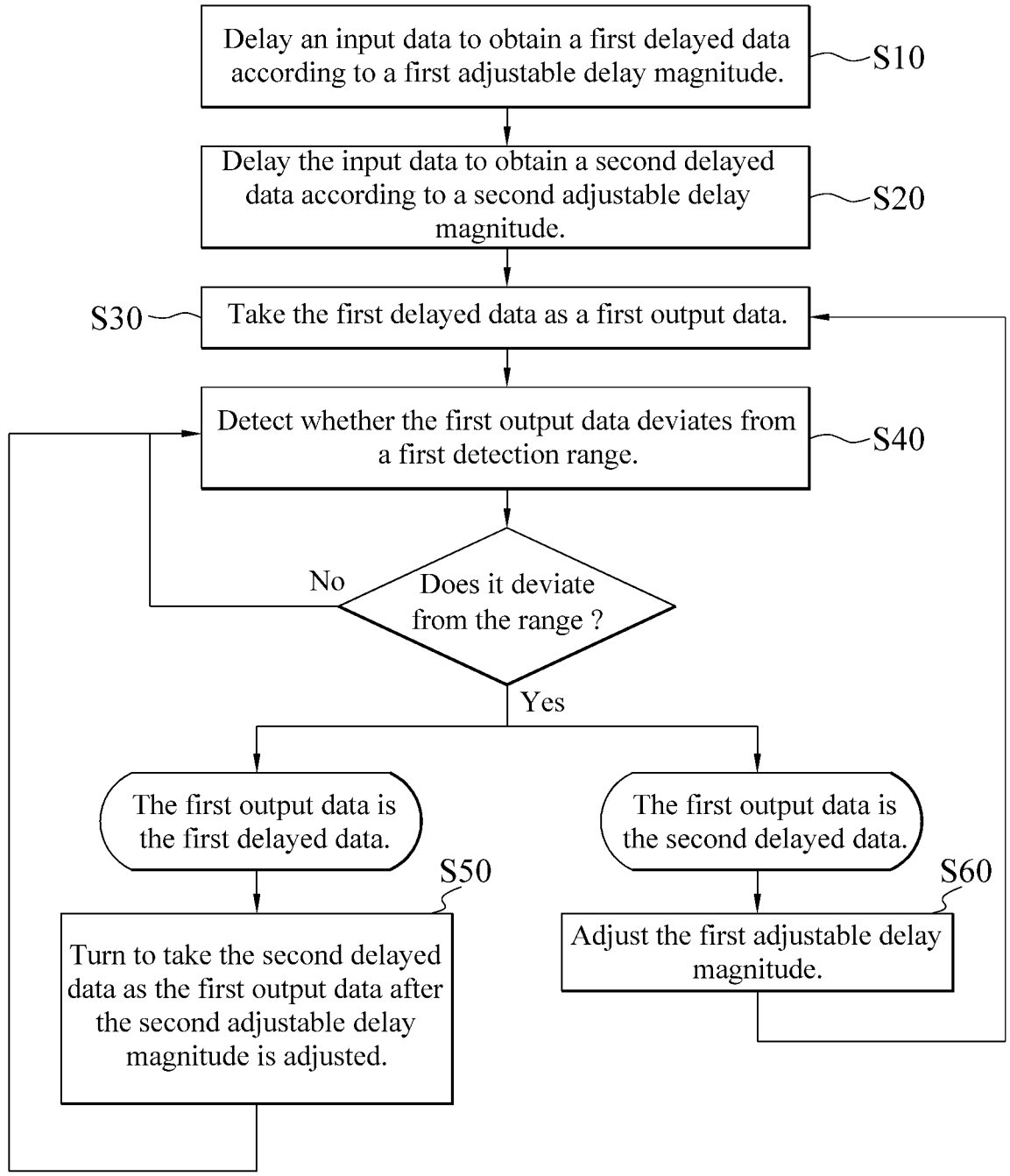
FIG. 5 illustrates a schematic flow diagram of a processing method for input data according to an embodiment of the present disclosure.

FIG. 5 illustrates a schematic flow diagram of a processing method for input data according to an embodiment of the present disclosure. Please refer to FIG. 1 and FIG. 5. In an embodiment of the processing method for input data D1, the data input device 100 can use the first delay line 110 to receive the input data D1 input through the input port 150, and the first delay line 110 can delay the input data D1 to obtain a first delayed data D21 according to the first adjustable delay magnitude currently set by the processing circuit 140 (for example, the first adjustable delay magnitude obtained in the training stage) (the step S10). Furthermore, the data input device 100 can use the second delay line 120 to receive the input data D1 input through the input port 150, and the second delay line 120 can delay the input data D1 to obtain a second delayed data D22 according to the second adjustable delay magnitude currently set by the processing circuit 140 (for example, the second adjustable delay magnitude obtained in the training stage) (the step S20). In some implementations, the step S10 and the step S20 may be exchanged or performed at the same time.

The data input device 100 can use the processing circuit 140 to normally select the first delayed data D21 as a first output data D31 output to the system circuit (the step S30).

In some embodiments, the processing circuit 140 includes a selection module 141 and a processing unit 142. The selection module 141 is coupled between the first delay line 110, the second delay line 120, and the system circuit. The processing unit 142 is coupled to the selection module 141, the first delay line 110, and the second delay line 120. The processing unit 142 is configured to generate the first setting signal A1 and the second setting signal A2 to set the first adjustable delay magnitude of the first delay line 110 and the second adjustable delay magnitude of the second delay line 120. Furthermore, the processing unit 142 is configured to generate a control signal S2 to the selection module 141 to cause the selection module 141 to select the first delayed data D21 or the second delayed data D22 as the first output data D31 according to the control signal S2.

In some embodiments, the processing unit 142 can normally generate the control signal S2 with a first value to the selection module 141, such that the selection module 141 normally selects the first delayed data D21 as the first output data D31.

In order to correct the deviation caused by the variations in voltage, temperature, and the like to the phase of the sampling clock CK, the data input device 100 can use the detection circuit 130 to detect the first delayed data D21 currently served as the first output data D31 to determine whether the first output data D31 deviates from the first detection range (the step S40), and the detection circuit 130 generates a first deviation signal S1 to the processing circuit 140 in response to that the detection circuit 130 detects the first output data D31 deviates from the first detection range.

In some embodiments, the detection circuit 130 can detect whether the first output data D31 deviates from the first detection range though the positive edges or negative edges of the sampling clock CK. Hereinafter, take the positive edges of the sampling clock CK as an example for illustration. In this embodiment, each piece of data of the input data D1 (or the first output data D31) has a data length, and a first detection range of the detection circuit 130 may be set to be centered on a corresponding positive edge of the sampling clock CK and has a predetermined ratio of the data length. For example, the detection circuit 130 sets the first detection range by using a left indicator and a right indicator centered on a positive edge of the sampling clock CK. The distance between the left indicator and the right indicator is the predetermined ratio of the data length. In some implementations, the predetermined ratio may be ranged from ½ to ¾, but the present disclosure is not limited thereto.

Figure 6:
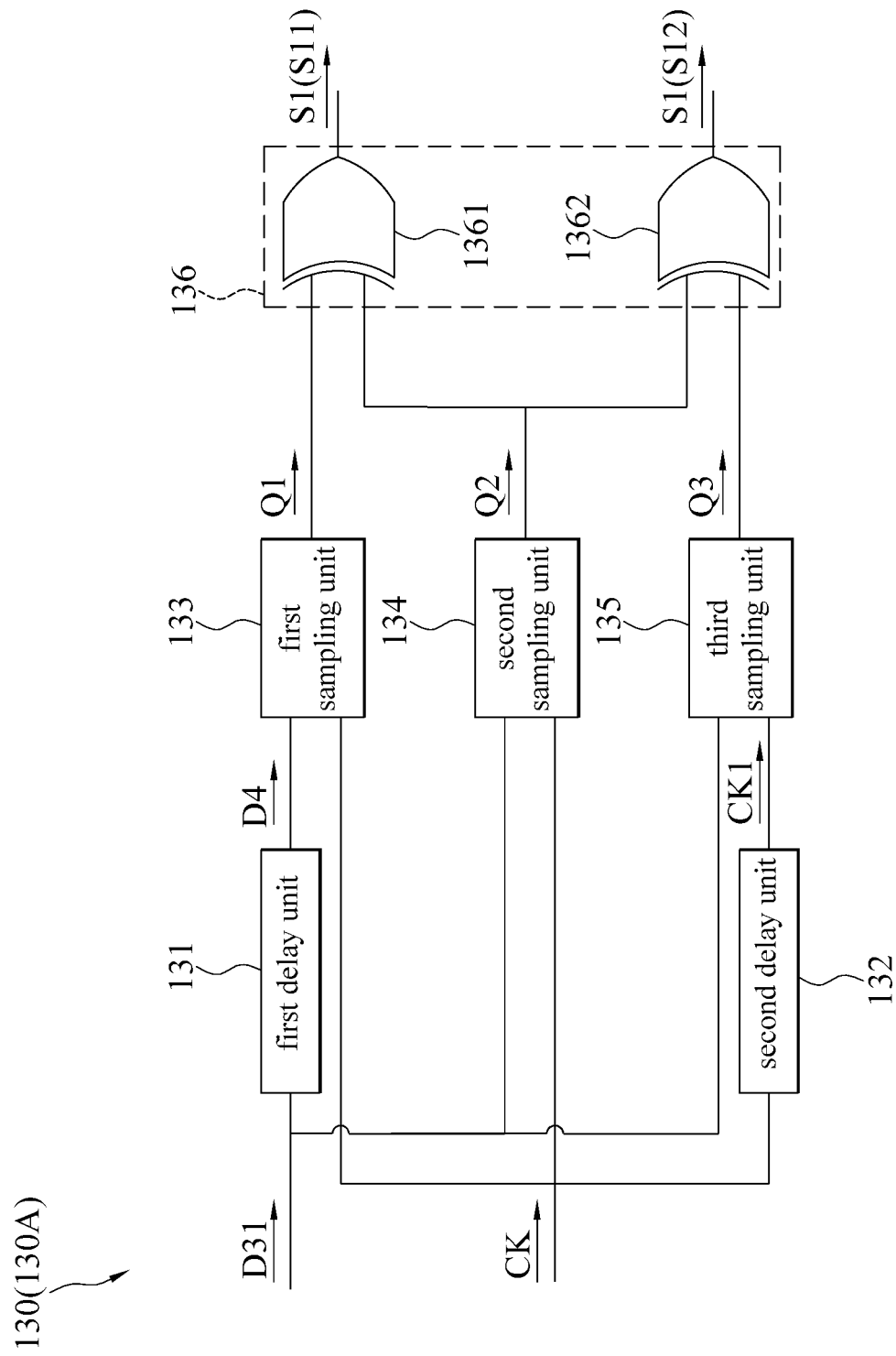
FIG. 6 illustrates a schematic block diagram of a positive edge detection module according to an embodiment of the present disclosure.

In some embodiments, the detection circuit 130 includes a positive edge detection module 130A. FIG. 6 illustrates a schematic block diagram of a positive edge detection module according to an embodiment of the present disclosure. Please refer to FIG. 6. The positive edge detection module 130A may include two delay units (hereinafter, referred to as a first delay unit 131 and a second delay unit 132, respectively), three sampling units (hereinafter, referred to as a first sampling unit 133, a second sampling unit 134, and a third sampling unit 135, respectively), and a determination unit 136. The first sampling unit 133 is coupled to the first delay unit 131, the third sampling unit 135 is coupled to the second delay unit 132, and the determination unit 136 is coupled to the first sampling unit 133, the second sampling unit 134, and the third sampling unit 135.

Figure 7:
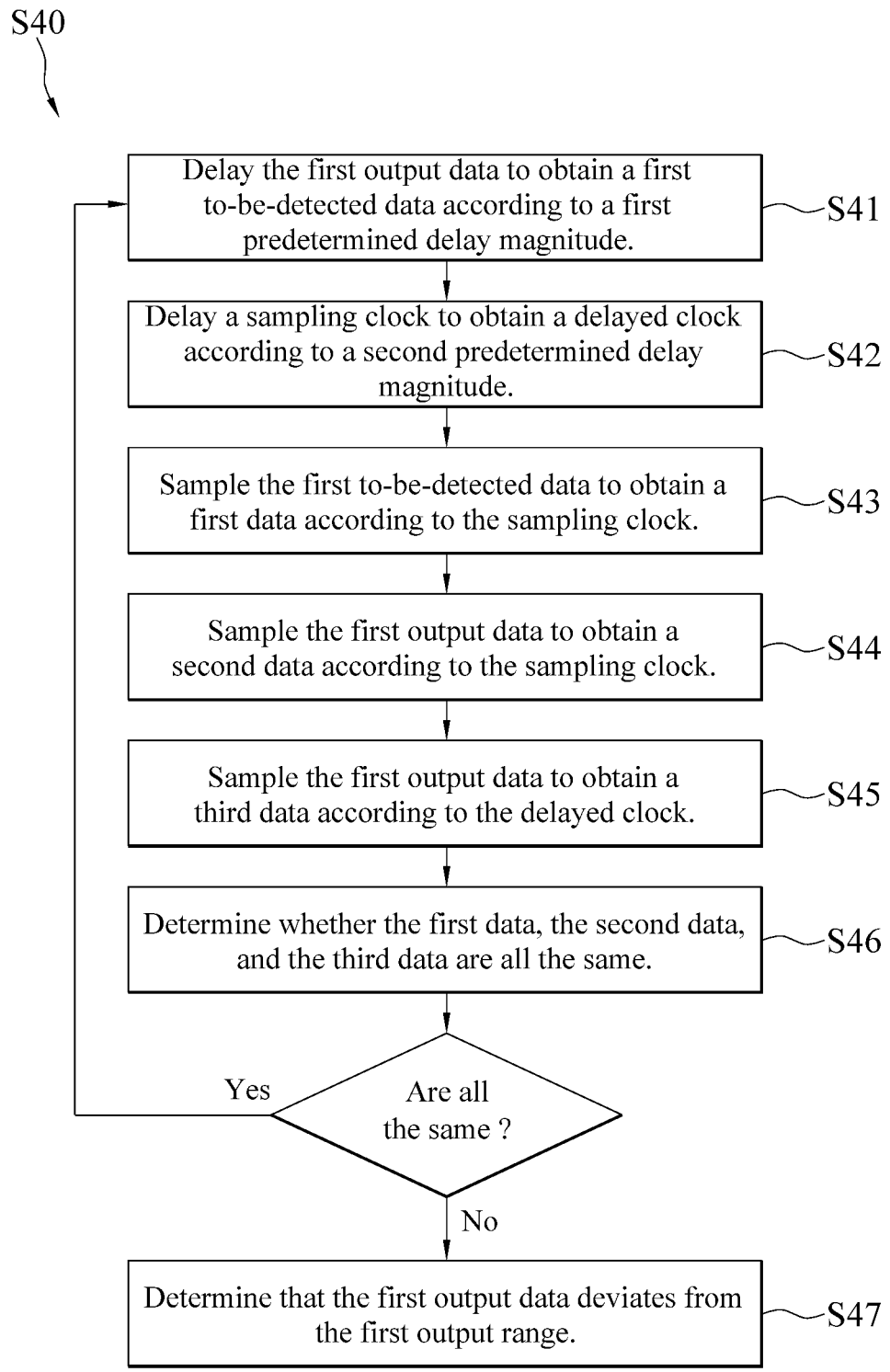
FIG. 7 illustrates a schematic diagram of the step S40 according to an embodiment of the present disclosure.

FIG. 7 illustrates a schematic diagram of the step S40 according to an embodiment of the present disclosure. Please refer to FIG. 1 and FIG. 5 to FIG. 7. In an embodiment of the step S40, the positive edge detection module 130A can use the first delay unit 131 to delay the first delayed data D21 currently served as the first output data D31 to obtain a first to-be-detected data D4 according to a first predetermined delay magnitude (the step S41), and the positive edge detection module 130A can use the second delay unit 132 to delay the sampling clock CK to obtain a delayed clock CK1 according to a second predetermined delay magnitude (the step S42). Next, the positive edge detection module 130A uses the first sampling unit 133 to sample the first to-be-detected data D4 to obtain a first data Q1 according to the sampling clock CK (the step S43), uses the second sampling unit 134 to sample the first delayed data D21 currently served as the first output data D31 to obtain a second data Q2 according to the sampling clock CK (the step S44), and uses the third sampling unit 135 to sample the first delayed data D21 currently served as the first output data D31 to obtain a third data Q3 according to the delayed clock CK1 (the step S45). Afterward, the positive edge detection module 130A can use the determination unit 136 to determine whether the first output data D31 deviated from the first detection range according to the first data Q1, the second data Q2, and the third data Q3 (the step S46). In response to that the first data Q1, the second data Q2, and the third data Q3 are all the same, the determination unit 136 determines that the first output data D31 does not deviate from the first detection range, and the positive edge detection module 130A can return to perform the step S41 to restart the detection. On the contrary, in response to that any the first data Q1, the second data Q2, and the third data Q3 are different, the determination unit 136 determines that the first output data D31 deviates from the first detection range (the step S47) and generates the first deviation signal S1 to the processing unit 142 of the processing circuit 140.

In some implementations, the first delay unit 131 and the second delay unit 132 may be implemented as the delay circuit in any form. The first sampling unit 133, the second sampling unit 134, and the third sampling unit 135 may be respectively implemented in a flip-flop, for example, but not limited to a D-type flip-flop. Furthermore, the determination unit 136 may be implemented by using two XOR gates 1361 and 1362. For example, as shown in FIG. 6, the XOR gate 1361 is coupled to the first sampling unit 133 and the second sampling unit 134 to generate a first sub-signal S11 of the first deviation signal S1 according to the first data Q1 and the second data Q2. Furthermore, the XOR gate 1362 is coupled to the second sampling unit 134 and the third sampling unit 135 to generate a second sub-signal S12 of the first deviation signal S1 according to the second data Q2 and the third data Q3. Moreover, the processing unit 142 can know, according to the first sub-signal S11 and the second sub-signal S12 of the first deviation signal S1, whether the first output data D31 deviates from the first detection range and the deviation situation when the first output data D31 deviates from the first detection range (i.e., leading or lagging). When the first sub-signal S11 of the first deviation signal S1 is "1", it represents that the first output data D31 is lagging. When the second sub-signal S12 of the first deviation signal S1 is "1", it represents that the first output data D31 is leading. When both the first sub-signal S11 and the second sub-signal S12 of the first deviation signal S1 are "0", it represents that the first output data D31 does not deviate from the first detection range. It should be noted that whether the first deviation signal S1 is output (or generated) in one or some embodiments of the present disclosure may be determined according to the values of the first sub-signal S11 and the second sub-signal S12 of the first deviation signal S1. When the value of the first sub-signal S11 or the value of the second sub-signal S12 is "1", it represents that the first deviation signal S1 is output. When both the values of the first sub-signal S11 and the second sub-signal S12 of the first deviation signal S1 are "0", it represents that the first deviation signal S1 is not output.

In some embodiments, after the processing unit 142 of the processing circuit 140 receives the first deviation signal S1 representing that the first delayed data D21 currently served as the first output data D31 deviates from the first detection range, the processing unit 142 can regenerate the second setting signal A2 to adjust the second adjustable delay magnitude of the second delay line 120 according to the first deviation signal S1, and after the second adjustable delay magnitude is adjusted, the processing unit 142 takes the second delayed data D22 generated by the second delay line 120 as the new first output data D31 (the step S50).

In an embodiment of the step S50, the processing unit 142 can correspondingly adjust the second adjustable delay magnitude according to whether the value "1" in the first deviation signal S1 is the first sub-signal S11 or the second sub-signal S12. In some embodiments, the positive edge detection module 130A of the detection circuit 130 may be coupled to the output of the selection module 141 to obtain the first delayed data D21 or the second delayed data D22 as the first output data D31, but the present disclosure is not limited thereto. In other embodiments, the data input device 100 may include two positive edge detection modules 130A respectively coupled to the outputs of the first delay line 110 and the second delay line 120 to respectively detect the first delayed data D21 and the second delayed data D22.

In an embodiment of the step S50, after the processing unit 142 adjusts the second adjustable delay magnitude, the processing unit 142 can wait for a period of stabilization and then turns to generate the control signal S2 with a second value to the selection module 141, such that the selection module 141 turns to take the second delayed data D22 as the first output data D31. The period of stabilization is referred to as the stabilization time of the data that is used to avoid sampling errors occurring in the subsequent sampling.

In some embodiments of the step S50, the second adjustable delay magnitude after being adjusted by the processing unit 142 can cause the positive edges of the sampling clock CK to hit (or locate at) the central position of the second delayed data D22 generated by the second delay line 120 according to the adjusted second adjustable delay magnitude.

In some embodiments, after the data input device 100 turns to take the second delayed data D22 as the first output data D31 (i.e., after performing the step S50), the data input device 100 can use the positive edge detection module 130A of the detection circuit 130 to detect the second delayed data D22 currently served as the first output data D31 to determine whether the first output data D31 deviates from the first detection range (the step S40), and the positive edge detection module 130A generates the first deviation signal S1 to the processing unit 142 of the processing circuit 140 in response to that the positive edge detection module 130A detects that the first output data D31 deviates from the first detection range. In this embodiment, the positive edge detection module 130A of the detection circuit 130 can use the first delay unit 131 to delay, according to the first predetermined delay magnitude, the second delayed data D22 currently served as the first output data D31 to obtain the first to-be-detected data D4 (the step S41), and the detection circuit 130 can use the second delay unit 132 to delay, according to the second predetermined delay magnitude, the sampling clock CK to obtain the delayed clock CK1 (the step S42). Next, the positive edge detection module 130A of the detection circuit 130 uses the first sampling unit 133 to sample, according to the sampling clock CK, the first to-be-detected data D4 to obtain the first data Q1 (the step S43), uses the second sampling unit 134 to sample, according to the sampling clock CK, the second delayed data D22 currently served as the first output data D31 to obtain the second data Q2 (the step S44), and uses the third sampling unit 135 to sample, according to the delayed clock CK1, the second delayed data D22 currently served as the first output data D31 to obtain the third data Q3 (the step S45). Afterward, the positive edge detection module 130A of the detection circuit 130 can use the determination unit 136 to determine, according to whether the first data Q1, the second data Q2, and the third data Q3 are all the same, whether the first output data D31 deviates from the first detection range (the step S46). In response to that the first data Q1, the second data Q2, and the third data Q3 are all the same, the determination unit 136 determines that the first output data D31 does not deviate from the first detection range, and the positive edge detection module 130A of the detection circuit 130 can return to perform the step S41 to restart the detection. On the contrary, in response to that any the first data Q1, the second data Q2, and the third data Q3 are different, the determination unit 136 determines the first output data D31 deviates from the first detection range (the step S47) and generates the first deviation signal S1 to the processing unit 142 of the processing circuit 140.

In some implementations, after the processing unit 142 of the processing circuit 140 receives the first deviation signal S1 representing that the second delayed data D22 currently served as the first output data D31 deviates from the first detection range, the processing unit 142 can regenerate the first setting signal A1 to adjust the first adjustable delay magnitude of the first delay line 110 according to the first deviation signal S1 (the step S60). After the first adjustable delay magnitude is adjusted, the processing unit 142 returns to perform step S30 to turn to take the first delayed data D21 generated by the first delay line 110 as the new first output data D31. Afterward, the processing unit 142 continues to perform the subsequent steps.

In an embodiment of the step S60, the processing unit 142 can correspondingly adjust the first adjustable delay magnitude according to whether the value "1" in the first deviation signal S1 is the first sub-signal S11 or the second sub-signal S12. Furthermore, after the processing unit 142 adjusts the first adjustable delay magnitude, the processing unit 142 can wait for a period of stabilization and then turns to generate the control signal S2 with the first value to the selection module 141, such that the selection module 141 turns to take the first delayed data D21 as the first output data D31. Moreover, the first adjustable delay magnitude after being adjusted by the processing unit 142 can cause the positive edges of the sampling clock CK to hit (or locate at) the central position of the first delayed data D21 generated by the first delay line 110 according to the adjusted first adjustable delay magnitude.

Figure 8:
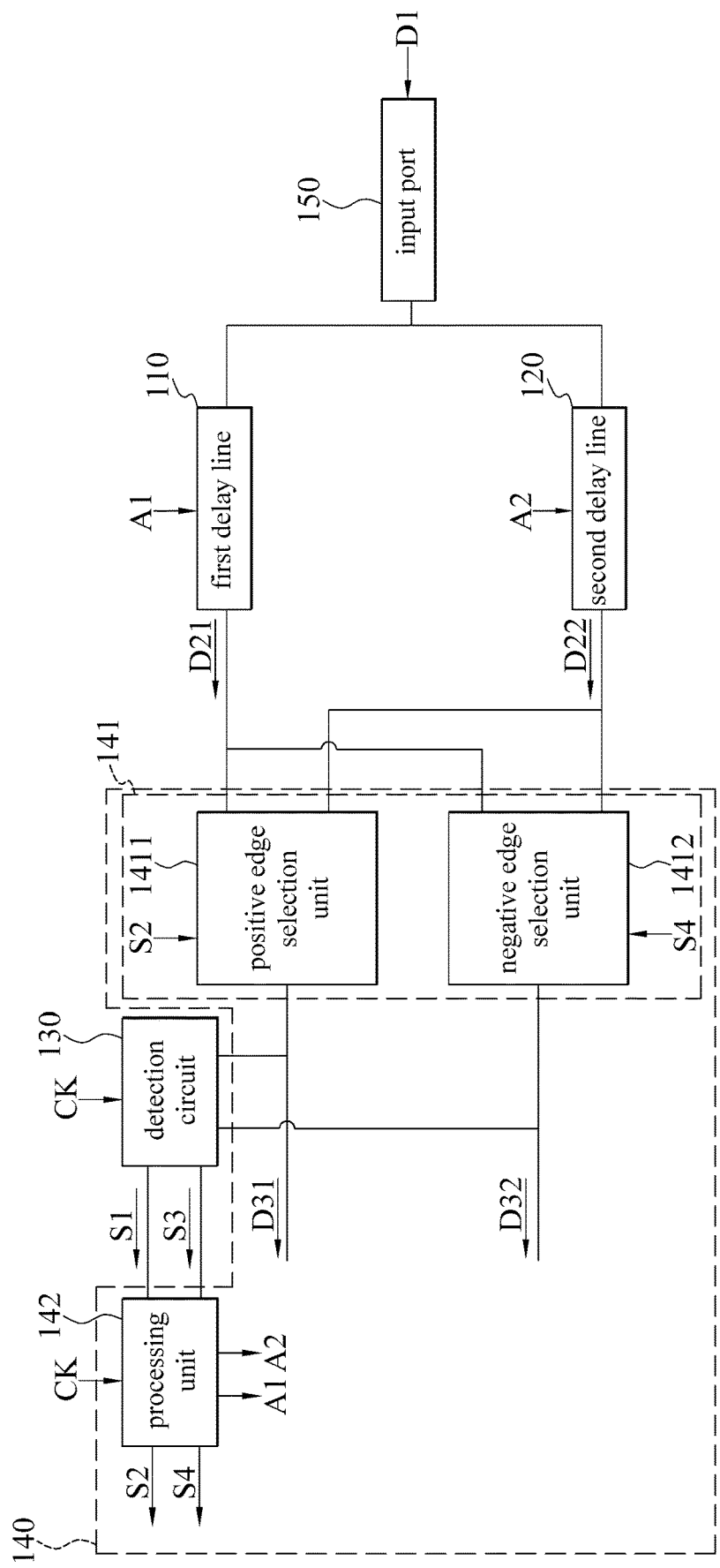
FIG. 8 illustrates a schematic block diagram of a data input device according to an embodiment of the present disclosure.

FIG. 8 illustrates a schematic block diagram of a data input device according to an embodiment of the present disclosure. Please refer to FIG. 8. In some embodiments, the selection module 141 of the processing circuit 140 includes a positive edge selection unit 1411 and a negative edge selection unit 1412. The positive edge selection unit 1411 is coupled between the first delay line 110, the second delay line 120, and the system circuit, and the negative edge selection unit 1412 is coupled between the first delay line 110, the second delay line 120, and the system circuit. In addition to generating the control signal S2, the processing unit 142 can further generate a control signal S4. The processing unit 142 outputs the control signal S2 to the positive edge selection unit 1411, such that the positive edge selection unit 1411 selects the first delayed data D21 or the second delayed data D22 as the first output data D31 according to the control signal S2. Furthermore, the processing unit 142 outputs the control signal S4 to the negative edge selection unit 1412, such that the negative edge selection unit 1412 selects the first delayed data D21 or the second delayed data D22 as a second output data D32 according to the control signal S4.

Figure 9:
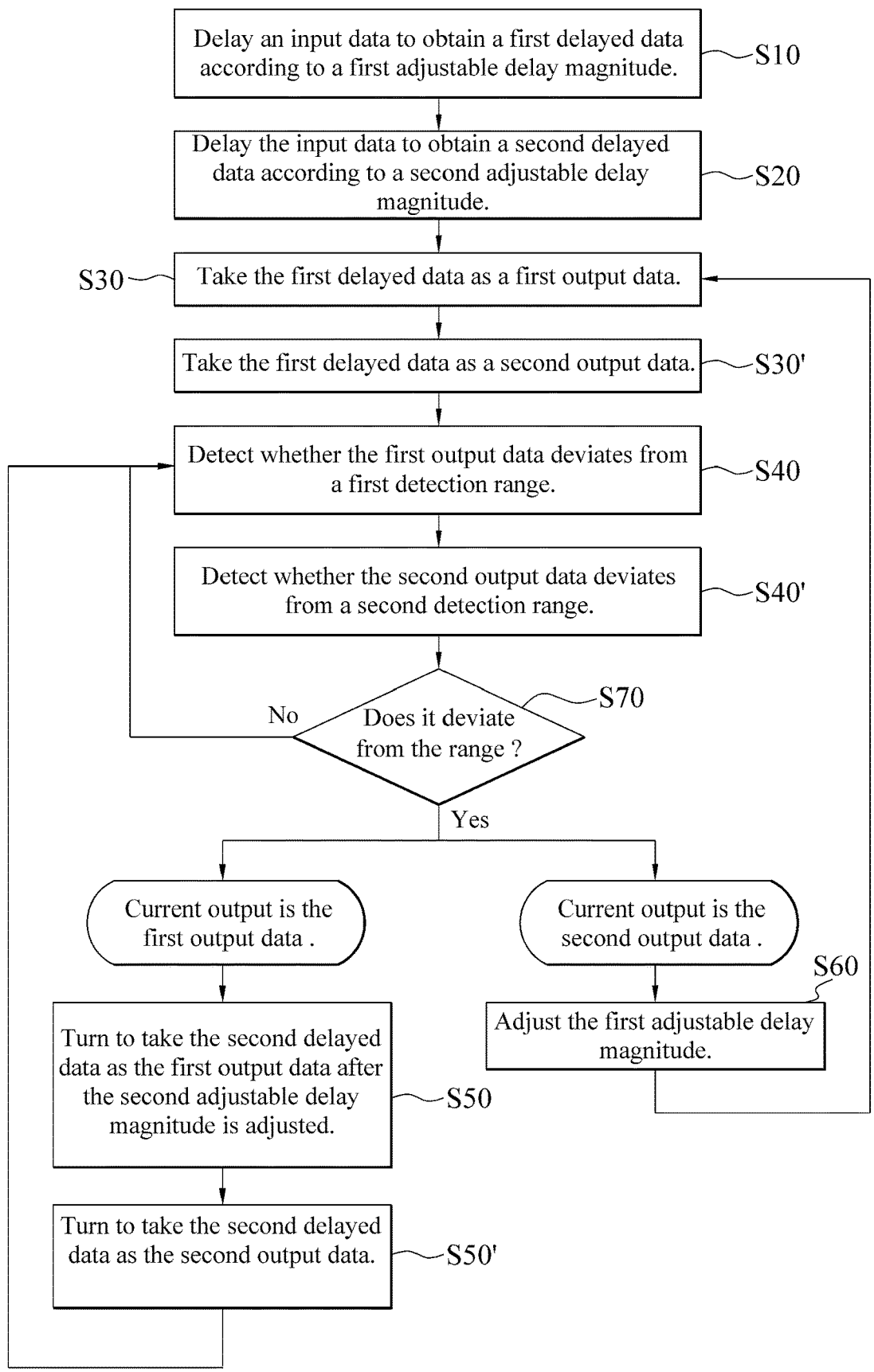
FIG. 9 illustrates a schematic flow diagram of a processing method for input data according to an embodiment of the present disclosure.

FIG. 9 illustrates a schematic flow diagram of a processing method for input data according to an embodiment of the present disclosure. Please refer to FIG. 8 and FIG. 9. In some embodiments, after the step S10 and the step S20, the processing unit 142 can normally generate the control signal S2 with the first value to the positive edge selection unit 1411, such that the positive edge selection unit 1411 normally selects the first delayed data D21 as the first output data D31 (the step S30). Furthermore, the processing unit 142 can normally generate the control signal S4 with a third value to the negative edge selection unit 1412, such that the negative edge selection unit 1412 normally selects the first delayed data D21 as the second output data D32 (the step S30'). In some implementations, the third value may be substantially the same as the first value.

In order to correct the deviation caused by the variations in voltage, temperature, and the like, the data input device 100 can use the detection circuit 130 to detect whether the first delayed data D21 currently served as the first output data D31 deviates from the first detection range (the step S40). Furthermore, the data input device 100 can use the detection circuit 130 to detect whether the first delayed data D21 currently served as the second output data D32 deviates from a second detection range (the step S40'), and the detection circuit 130 generates a second deviation signal S3 to the processing circuit 140 in response to that the detection circuit 130 detects that the second output data D32 deviates from the second detection range.

In some embodiments, the first detection range of the detection circuit 130 may be set to be centered on a corresponding positive edge of the sampling clock CK and has a first predetermined ratio of the data length, and the second detection range of the detection circuit 130 may be set to be centered on a corresponding negative edge of the sampling clock CK and has a second predetermined ratio of the data length. In some embodiments, the first predetermined ratio may be the same as the second predetermined ratio. In other words, in this embodiment, the size of the first detection range may be substantially equal to the size of the second detection range. In some implementations, the first predetermined ratio and the second predetermined ratio may be ranged from ½ to ¾, but the present disclosure is not limited thereto.

Figure 10:
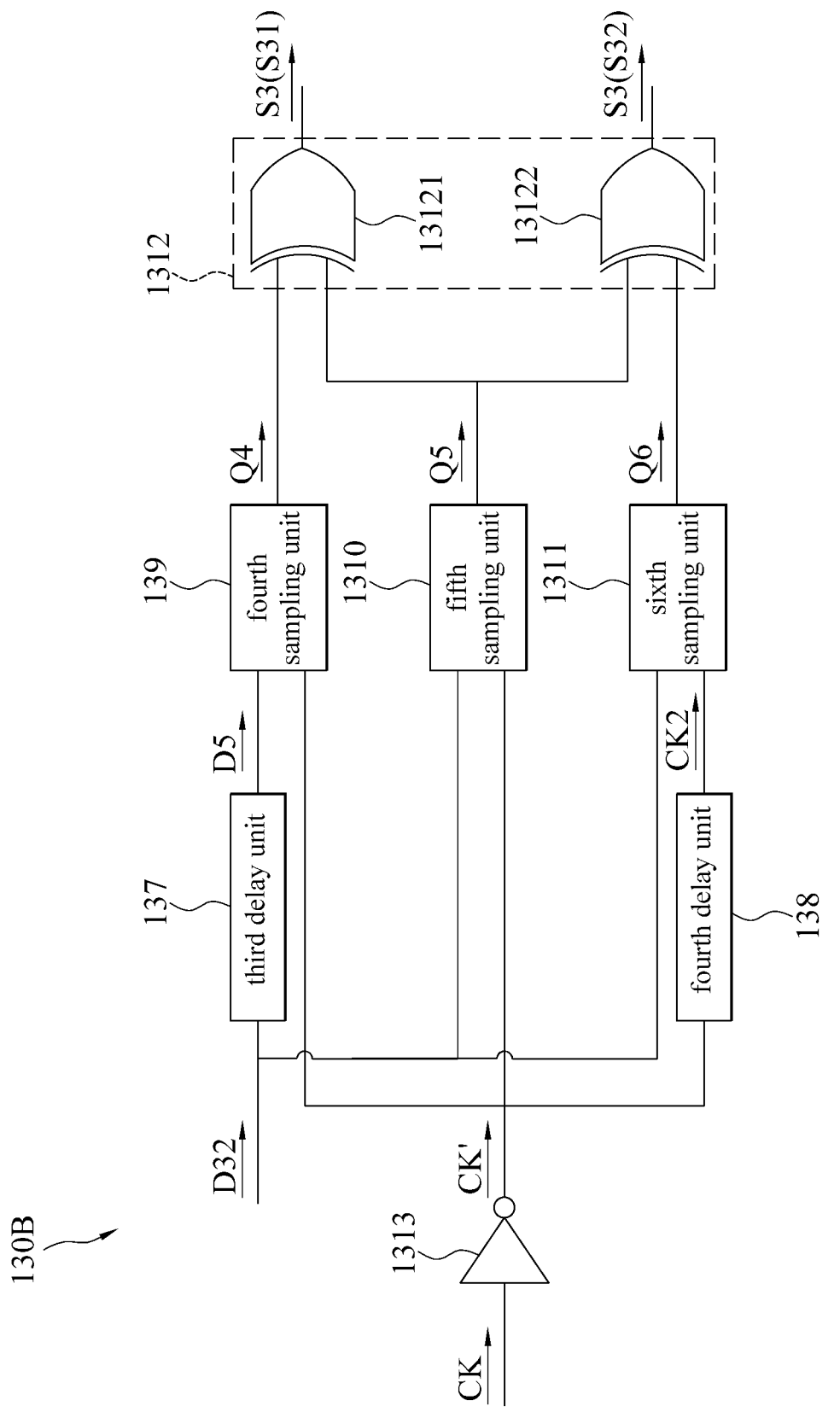
FIG. 10 illustrates a schematic block diagram of a negative edge detection module according to an embodiment of the present disclosure.

FIG. 10 illustrates a schematic block diagram of a negative edge detection module according to an embodiment of the present disclosure. Please refer to FIG. 6 and FIG. 10. In some embodiments, the detection circuit 130 may include the positive edge detection module 130A and a negative edge detection module 130B. In this embodiment, as shown in FIG. 6, the positive edge detection module 130A includes the first delay unit 131, the second delay unit 132, the first sampling unit 133, the second sampling unit 134, the third sampling unit 135, and the determination unit 136 described above. As shown in FIG. 10, the negative edge detection module 130B includes two delay units (hereinafter, referred to as a third delay unit 137 and a fourth delay unit 138, respectively), three sampling units (hereinafter, referred to as a fourth sampling unit 139, a fifth sampling unit 1310, and a sixth sampling unit 1311, respectively), a determination unit 1312, and an inverter 1313. The fourth sampling unit 139 is coupled to the third delay unit 137; the fifth sampling unit 1310 is coupled to the fourth delay unit 138; the determination unit 1312 is coupled to the fourth sampling unit 139, the fifth sampling unit 1310, and the sixth sampling unit 1311; and the inverter 131 is coupled to the fourth sampling unit 139, the fifth sampling unit 1310, and the fourth delay unit 138.

Figure 11:
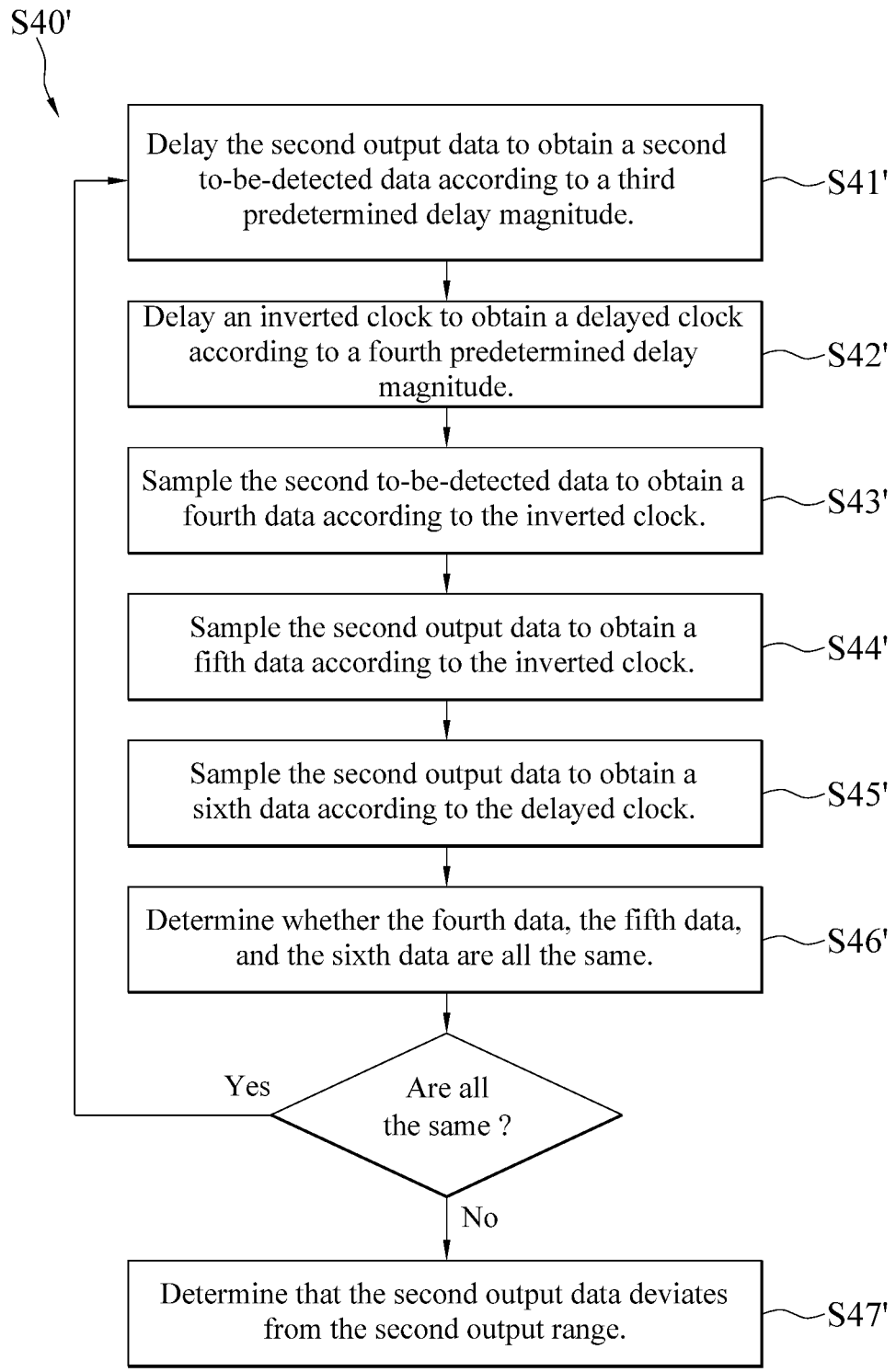
FIG. 11 illustrates a schematic diagram of the step S40' according to an embodiment of the present disclosure.

FIG. 11 illustrates a schematic diagram of the step S40' according to an embodiment of the present disclosure. In an embodiment of the step S40', the detection circuit 130 can use the third delay unit 137 to delay, according to a third predetermined delay magnitude, the first delayed data D21 currently served as the second output data D32 to obtain a second to-be-detected data D5 (the step S41'). Next, the detection circuit 130 can use the inverter 1313 to invert the sampling clock CK to obtain an inverted clock CK', and then the detection circuit 130 uses the fourth delay unit 138 to delay, according to a fourth predetermined delay magnitude, the inverted clock CK' to obtain a delayed clock CK2 (the step S42'). Next, the detection circuit 130 uses the fourth sampling unit 138 to sample, according to the inverted clock CK', the second to-be-detected data D5 to obtain a fourth data Q4 (the step S43'), uses the fifth sampling unit 1310 to sample, according to the inverted clock CK', the first delayed data D21 currently served as the second output data D32 to obtain a fifth data Q5 (the step S44'), and uses the sixth sampling unit 1311 to sample, according to the delayed clock CK2, the first delayed data D21 currently served as the second output data D32 to obtain a sixth data Q6 (the step S45'). Afterward, the detection circuit 130 can use the determination unit 1312 to determine whether the second output data D32 deviates from the second detection range according to whether the fourth data Q4, the fifth data Q5, and the sixth data Q6 are all the same (the step S46'). In response to that the fourth data Q4, the fifth data Q5, and the sixth data Q6 are all the same, the determination unit 1312 determines that the second output data D32 does not deviate from the second detection range, and the detection circuit 130 can return to perform the step S41' to restart the detection. On the contrary, in response to that any the fourth data Q4, the fifth data Q5, and the sixth data Q6 are different, the determination unit 1312 determines the second output data D32 deviates from the second detection range (the step S47'), and the determination unit 1312 generates the second deviation signal S3 to the processing unit 142 of the processing circuit 140.

In some implementations, the implementations of the third delay unit 137 and the fourth delay unit 138 are substantially the same as the implementations of the first delay unit 131 and the second delay unit 132. The implementations of the fourth sampling unit 139, the fifth sampling unit 1310, and the sixth sampling unit 1311 are substantially the same as the implementations of the first sampling unit 133, the second sampling unit 134, and the third sampling unit 135. Thus, detailed descriptions thereof will be omitted. Furthermore, in some implementations, the negative edge detection module 130B may not include the inverter 1313; instead, the fourth sampling unit 139, the fifth sampling unit 1310, and the sixth sampling unit 1311 are implemented by using negative edge sampling units.

In some implementations, the determination unit 1312 may be implemented by using two XOR gates 13121 and 13122. For example, as shown in FIG. 10, the XOR gate 13121 is coupled to the fourth sampling unit 139 and the fifth sampling unit 1310 to generate a first sub-signal S31 of the second deviation signal S3 according to the fourth data Q4 and the fifth data Q5. Furthermore, the XOR gate 13122 is coupled to the fifth sampling unit 1310 and the sixth sampling unit 1311 to generate a second sub-signal S32 of the second deviation signal S3 according to the fifth data Q5 and the sixth data Q6. Moreover, the processing unit 142 can know, according to the first sub-signal S31 and the second sub-signal S32 of the second deviation signal S3, whether the second output data D32 deviates from the second detection range and the deviation situation when the second output data D32 deviates from the second detection range (i.e., leading or lagging). When the first sub-signal S31 of the second deviation signal S3 is "1", it represents that the second output data D32 is lagging. When the second sub-signal S32 of the second deviation signal S3 is "1", it represents that the second output data D32 is leading. When both the first sub-signal S31 and the second sub-signal S32 of the second deviation signal S3 are "0", it represents that the second output data D32 does not deviate from the second detection range. It should be noted that, in one or some embodiments of the present disclosure, whether the second deviation signal S3 is output (or generated) may be determined according to the values of the first sub-signal S31 and the second sub-signal S32 of the second deviation signal S3. When the value of the first sub-signal S31 or the value of the second sub-signal S32 is "1", it represents that the second deviation signal S3 is output. When both the values of the first sub-signal S31 and the second sub-signal S32 of the second deviation signal S3 are "0", it represents that the second deviation signal S3 is not output.

In some embodiments, the processing unit 142 of the processing circuit 140 can determine whether a first deviation signal S1 representing that the first delayed data D21 currently served as the first output data D31 deviates from the first detection range is received by the processing unit 142, or a second deviation signal S3 representing that the first delayed data D21 currently served as the second output data D32 deviates from the second detection range is received by the processing unit 142 (the step S70). When the processing unit 142 receives the first deviation signal S1 or the second deviation signal S3, it represents that it is required to perform the adjustment again, therefore, the processing unit 142 can regenerate, according to the received first deviation signal S1 or the received second deviation signal S3, the second setting signal A2 to adjust the second adjustable delay magnitude of the second delay line 120. After the second adjustable delay magnitude of the second delay line 120 is adjusted, the processing unit 142 turns to take the second delayed data D22 generated by the second delay line 120 as the new first output data D31 through the positive edge selection unit 1411 (the step S50), and the processing unit 142 turns to take the second delayed data D22 as the new second output data D32 through the negative edge selection unit 1412 (the step S50').

In an embodiment of the step S50', in response to that the processing unit 142 receives the second deviation signal S3, the processing unit 142 can correspondingly adjust the second adjustable delay magnitude according to whether the value "1" in the second deviation signal S3 is the first sub-signal S31 or the second sub-signal S32. In some embodiments, the positive edge detection module 130A of the detection circuit 130 may be coupled to the output of the positive edge selection unit 1411 to obtain the first delayed data D21 or the second delayed data D22 as the first output data D31, and the negative edge detection module 130B of the detection circuit 130 may be coupled to the output of the negative edge selection unit 1412 to obtain the first delayed data D21 or the second delayed data D22 as the second output data D32, but the present disclosure is not limited thereto. In other embodiments, the detection circuit 130 may include two positive edge detection modules 130A respectively coupled to the outputs of the first delay line 110 and the second delay line 120 to respectively detect the first delayed data D21 and the second delay data D22. Furthermore, the detection circuit 130 may include two negative edge detection modules 130B respectively coupled to the outputs of the first delay line 110 and the second delay line 120 to respectively detect the first delayed data D21 and the second delay data D22.

In an embodiment of the step S50 and the step S50', after the processing unit 142 adjusts the second adjustable delay magnitude, the processing unit 142 can wait for a period of stabilization and then turns to generate the control signal S2 with a second value to the positive edge selection unit 1411 and to generate the control signal S4 with a fourth value to the negative edge selection unit 1412, such that the positive edge selection unit 1411 and the negative edge selection unit 1412 respectively turns to take the second delayed data D22 as the first output data D31 and the second output data D32.

In an embodiment of the step S50 and the step S50', the second adjustable delay magnitude after being adjusted by the processing unit 142 can cause the positive edges and/or negative edges of the sampling clock CK to hit (or locate at) the central position of the second delayed data D22 generated by the second delay line 120 according to the adjusted second adjustable delay magnitude.

In some embodiments, after the data input device 100 turns to take the second delayed data D22 as the first output data D31 and the second output data D32 respectively (i.e., after performing the step S50 and the step S50'), the data input device 100 can use the positive edge detection module 130A of the detection circuit 130 to detect the second delayed data D22 currently served as the first output data D31 to determine whether the first output data D31 deviates from the first detection range (the step S40), and the positive edge detection module 130A generates the first deviation signal S1 to the processing unit 142 of the processing circuit 140 in response to that the positive edge detection module 130A detects the first output data D31 deviates from the first detection range. Furthermore, the data input device 100 can use the negative edge detection module 130B to detect the second delayed data D22 currently served as the second output data D32 to determine whether the second output data D32 deviates from the second detection range (the step S40'), and the negative edge detection module 130B generates the second deviation signal S3 to the processing unit 142 of the processing circuit 140 in response to that the negative edge detection module 130B detects the second output data D32 deviates from the second detection range. Herein, the detailed description of the step S40 that determines whether the second delay data D22 currently served as the first output data D31 deviates from the first detection range can be referred to the above description, thus, detailed descriptions thereof will be omitted. Furthermore, the detailed description of the step S40' that determines whether the second delay data D22 currently served as the second output data D32 deviates from the second detection range can also be referred to the above description by replacing the first delayed data D21 with the second delayed data D22, thus, detailed descriptions thereof will also be omitted.

In some embodiments, the processing unit 142 of the processing circuit 140 can determine whether a first deviation signal S1 representing that the second delayed data D22 currently served as the first output data D31 deviates from the first detection range is received by the processing unit 142, or a second deviation signal S3 representing that the second delayed data D22 currently served as the second output data D32 deviates from the second detection range is received by the processing unit 142 (S70). When the processing unit 142 receives the first deviation signal S1 or the second deviation signal S3, it represents that it is required to perform the adjustment again, therefore, the processing unit 142 can regenerate, according to the received first deviation signal S1 or the received second deviation signal S3, the first setting signal A1 to adjust the first adjustable delay magnitude of the first delay line 110 (the step S60). After the first adjustable delay magnitude of the first delay line 110 is adjusted, the processing unit 142 returns to perform the step S30 and the step S30' to turn to take the first delayed data D21 generated by the first delay line 110 as the new first output data D31 through the positive edge selection unit 1411 and turn to take the first delayed data D21 as the new second output data D32 through the negative edge selection unit 1412. Afterward, the processing unit 142 continues to perform the subsequent steps.

In some embodiments of the step S60, when the processing unit 142 receives the second deviation signal S3, the processing unit 142 can correspondingly adjust the first adjustable delay magnitude according to whether the value "1" in the second deviation signal S3 is the first sub-signal S31 or the second sub-signal S32. Furthermore, after the processing unit 142 adjusts the first adjustable delay magnitude, the processing unit 142 can wait for a period of stabilization and then turns to generate the control signal S2 with the first value to the positive edge selection unit 1411 and to generate the control signal S4 with the third value to the negative edge selection unit 1412, such that the positive edge selection unit 1411 and the negative edge selection unit 1412 respectively turn to take the first delayed data D21 as the first output data D31 and the second output data D32. Furthermore, the first adjustable delay magnitude after being adjusted by the processing unit 142 can cause the positive edges and/or negative edges of the sampling clock CK to hit (or locate at) the central position of the first delayed data D21 generated by the first delay line 110 according to the adjusted first adjustable delay magnitude.

In some embodiments, when the processing unit 142 receives the first deviation signal S1 and the second deviation signal S3 at the same time, the two deviation signals will basically cause the processing unit 142 to adjust the delayed data (i.e., the first delayed data D21 or the second delayed data D22) in the same adjustment direction (i.e., both increase the delay magnitude or decrease the delay magnitude). However, in some embodiments, if the adjustment directions indicated by the first deviation signal S1 and the second deviation signal S3 are different (for example, one deviation signal indicates increasing the delay magnitude while the other deviation signal indicates decreasing the delay magnitude), it represents that the first detection range and the second detection range that currently used are too wide and need to be reduced.

Figure 12:
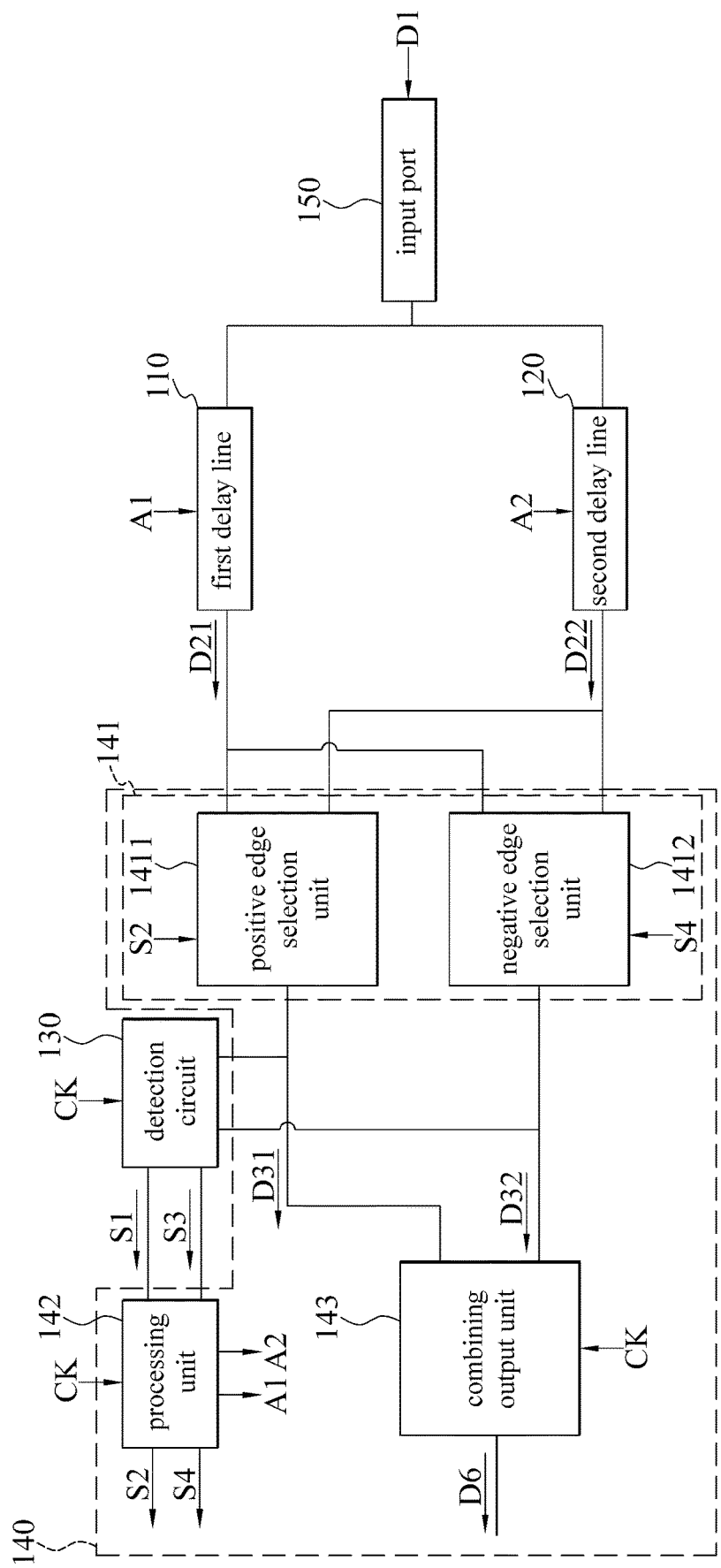
FIG. 12 illustrates a schematic block diagram of a data input device according to an embodiment of the present disclosure.

FIG. 12 illustrates a schematic block diagram of a data input device according to an embodiment of the present disclosure. Please refer to FIG. 12. In some embodiments, the processing circuit 140 may further include a combining output unit 143, and the combining output unit 143 is coupled to the positive edge selection unit 1411 and the negative edge selection unit 1412. Furthermore, the combining output unit 143 receives the sampling clock CK.

In an embodiment of the processing method, the processing circuit 140 can further use the combining output unit 143 to combine, according to the sampling clock CK, the first output data D31 and the second output data D32 to obtain a combined data D6, and the combining output unit 143 outputs the combined data D6 to the system circuit. In this way, the system circuit can sample the combined data D6 by only using the positive edges or negative edges of the sampling clock CK.

In some embodiments, the processing circuit 140 may further include at least two synchronizers (not shown) respectively coupled between the processing unit 142 and the positive edge selection unit 1411 and between the processing unit 142 and the negative edge selection unit 1412. The two synchronizers receive the sampling clock CK and are respectively configured to cause the control signal S2 and the control signal S4 to be synchronized in timing.

To sum up, according to one or some embodiments of the present disclosure, the data input device and the processing method for input data use a first delay line and a second delay line to delay an input data to separately obtain a first delayed data and a second delayed data and normally take the first delayed data as a first output data and detect whether the first output data deviates from a first detection range. In response to detecting that the first output data deviates from the first detection range, the deviation can be corrected by adjusting another delay line, for example, a second adjustable delay magnitude of the second delay line, and the data input device and the processing method according to one or some embodiments of the present disclosure take the second delayed data delayed by the second delay line as the new first output data after the second adjustable delay amount is adjusted. In this way, it is not necessary to interrupt the data transmission during correction, thereby achieving the high-speed transmission of input data. Furthermore, compared with a circuit that performs correction by delaying a sampling clock, one or some embodiments of the present disclosure can ensure that the sampling clock can hit the center position in each piece of data of the input data.

Although the present disclosure has been described in considerable detail with reference to certain preferred embodiments thereof, the disclosure is not for limiting the scope of the application. Persons having ordinary skill in the art may make various modifications and changes without departing from the scope and spirit of the present disclosure. Therefore, the scope of the appended claims should not be limited to the description of the preferred embodiments described above.

What is claimed is:

1. A data input device, comprising:
    a first delay line configured to delay an input data to obtain a first delayed data according to a first adjustable delay magnitude;
    a second delay line configured to delay the input data to obtain a second delayed data according to a second adjustable delay magnitude;
    a detection circuit configured to detect whether a first output data output to a system circuit deviates from a first detection range and to generate a first deviation signal in response to that the detection circuit detects the first output data deviates from the first detection range; and a processing circuit configured to normally take the first delayed data as the first output data, wherein the processing circuit takes the second delayed data as the first output data after the processing circuit adjusts the second adjustable delay magnitude in response to that the processing circuit receives the first deviation signal representing that the first delayed data deviates from the first detection range.

2. The data input device according to claim 1, wherein after the processing circuit takes the second delayed data as the first output data, the processing circuit further returns to take the first delayed data as the first output data after the processing circuit adjusts the first adjustable delay magnitude in response to that the processing circuit receives another first deviation signal representing that the second delayed data deviates from the first detection range.

3. The data input device according to claim 1, wherein the detection circuit comprises:
a first delay unit configured to delay the first output data to obtain a first to-be-detected data according to a first predetermined delay magnitude;
a second delay unit configured to delay a sampling clock to obtain a delayed clock according to a second predetermined delay magnitude;
a first sampling unit configured to sample the first to-be-detected data to obtain a first data according to the sampling clock;
a second sampling unit configured to sample the first output data to obtain a second data according to the sampling clock;
a third sampling unit configured to sample the first output data to obtain a third data according to the delayed clock; and
a determination unit configured to determine whether the first data, the second data, and the third data are all the same, wherein the determination unit generates the first deviation signal in response to that the determination unit determines that any of the first data, the second data, and the third data are different.

4. The data input device according to claim 1, wherein the processing circuit comprises:
a positive edge selection unit configured to select the first delayed data or the second delayed data as the first output data;
a negative edge selection unit configured to select the first delayed data or the second delayed data as a second output data output to the system circuit;
a combining output unit configured to combine the first output data and the second output data into a combined data and to output the combined data to the system circuit; and
a processing unit configured to normally control the positive edge selection unit to take the first delayed data as the first output data and to normally control the negative edge selection unit to take the first delayed data as the second output data.

5. The data input device according to claim 4, wherein the detection circuit comprises:
a positive edge detection module configured to detect whether the first output data deviates from the first detection range and to generate the first deviation signal in response to that the positive edge detection module detects the first output data deviates from the first detection range; and
a negative edge detection module configured to detect whether the second output data deviates from a second detection range and to generate a second deviation signal in response to that the negative edge detection module detects the second output data deviates from the second detection range;
wherein, in response to that the processing unit receives the first deviation signal representing that the first delayed data deviates from the first detection range or the second deviation signal representing that the first delayed data deviates from the second detection range, the processing unit controls the positive edge selection unit and the negative edge selection unit to respectively take the second delayed data as the first output data and the second output data after the processing unit adjusts the second adjustable delay magnitude, and in response to that the processing unit receives the first deviation signal representing that the second delayed data deviates from the first detection range or the second deviation signal representing that the second delayed data deviates from the second detection range, the processing unit controls the positive edge selection unit and the negative edge selection unit to respectively take the first delayed data as the first output data and the second output data after the processing unit adjusts the first adjustable delay magnitude.

6. A processing method for input data, comprising:
delaying an input data to obtain a first delayed data according to a first adjustable delay magnitude;
delaying the input data to obtain a second delayed data according to a second adjustable delay magnitude;
normally taking the first delayed data as a first output data output to a system circuit;
detecting whether the first output data deviates from a first detection range; and
taking the second delayed data as the first output data after adjusting the second adjustable delay magnitude in response to detecting that the first delayed data as the first output data deviates from the first detection range.

7. The processing method for input data according to claim 6, wherein after the step of taking the second delayed data as the first output data further comprises:
returning to the step of taking the first delayed data as the first output data output to the system circuit after adjusting the first adjustable delay magnitude in response to detecting that the second delayed data as the first output data deviates from the first detection range.

8. The processing method for input data according to claim 6, wherein the step of detecting whether the first output data deviates from the first detection range comprises:
delaying the first output data to obtain a first to-be-detected data according to a first predetermined delay magnitude;
delaying a sampling clock to obtain a delayed clock according to a second predetermined delay magnitude;
sampling the first to-be-detected data to obtain a first data according to the sampling clock;
sampling the first output data to obtain a second data according to the sampling clock;
sampling the first output data to obtain a third data according to the delayed clock;
determining whether the first data, the second data, and the third data are all the same; and
determining that the first output data is detected to deviate from the first detection range in response to determining that any of the first data, the second data, and the third data are different.

9. The processing method for input data according to claim 6, further comprising:
   normally taking the first delayed data as a second output data output to the system circuit;
   detecting whether the second output data deviates from a second detection range, wherein the step of taking the second delayed data as the first output data after adjusting the second adjustable delay magnitude in response to detecting that the first delayed data as the first output data deviates from the first detection range is: taking the second delayed data as the first output data and the second output data after adjusting the second adjustable delay magnitude in response to detecting that the first delayed data as the first output data deviates from the first detection range or detecting that the first delayed data as the second output data deviates from the second detection range; and
   performing the step of taking the first delayed data as the first output data output to the system circuit and the step of taking the first delayed data as the second output data output to the system circuit after adjusting the first adjustable delay magnitude in response to detecting that the second delayed data as the first output data deviates from the first detection range or detecting that the second delayed data as the second output data deviates from the second detection range.

10. The processing method for input data according to claim 9, further comprising:
   combining the first output data and the second output data into a combined data; and
   outputting the combined data to the system circuit.

\* \* \* \* \*